United States Patent [19]

Koshar et al.

[11] 4,247,674

[45] Jan. 27, 1981

[54] USE OF BIS(FLUOROALIPHATICSULFONYL)IMIDES IN POLYMERIZATION OF ORGANOCYCLOSILOXANES

[75] Inventors: Robert J. Koshar, Mahtomedi; Stephen W. Bany, North Saint Paul, both of Minn.

[73] Assignee: Minnesota Mining and Manufacturing Company, Saint Paul, Minn.

[21] Appl. No.: 65,988

[22] Filed: Aug. 13, 1979

[51] Int. Cl.$^3$ .............................................. C08G 77/04
[52] U.S. Cl. .................................... 528/21; 528/23; 528/32; 528/33; 528/34; 528/36; 528/37; 528/41; 528/42; 528/43; 556/467
[58] Field of Search ............... 528/37, 32, 33, 34, 528/36, 41, 42, 43, 21, 23; 260/448.2 E, 448.2 B; 556/467

[56] References Cited

U.S. PATENT DOCUMENTS

| | | | |
|---|---|---|---|
| 4,020,043 | 4/1977 | Siefken | 526/3 |
| 4,031,036 | 6/1977 | Koshar | 260/2 N |
| 4,049,861 | 9/1977 | Nozari | 528/21 |
| 4,167,617 | 9/1979 | Siefken | 528/23 |

FOREIGN PATENT DOCUMENTS 2239817  2/1974  Fed. Rep. of Germany.

OTHER PUBLICATIONS

Meussdoerffer et al., Chem. Zeitung, 96 (10), 582, (1972).

Primary Examiner—Melvyn I. Marquis
Attorney, Agent, or Firm—Cruzan Alexander; Donald M. Sell; Mark A. Litman

[57] ABSTRACT

Bis(fluoroaliphaticsulfonyl)imides are used as catalysts for the ring-opening polymerization of organocyclosiloxanes to produce lubricants, coatings or rubber precursors.

16 Claims, No Drawings

USE OF BIS(FLUOROALIPHATICSULFONYL)IMIDES IN POLYMERIZATION OF ORGANOCYCLOSILOXANES

This invention relates to the ring-opening polymerization of organocyclosiloxanes to produce lubricants, coatings and rubber precursors (i.e., liquid or gum intermediates which can be further cured to rubber). In another aspect, it relates to a process for catalyzing the polymerization of organocyclosiloxanes with a new catalyst therefor, and to the cured products thereby produced.

Conventional organocyclosiloxanes, especially cyclotrisiloxanes and cyclotetrasiloxanes, heretofore have been polymerized (i.e., ring opened) by the use of basic or acidic catalysts. Basic catalysts such as KOH, lithium methoxide, ethyl lithium and lithium silanoate are known to ring-open organocyclosiloxanes but generally require elevated temperatures, e.g., 140° C., to polymerize the organocyclosiloxane monomers within a reasonable time period. Lewis and protonic acid catalysts such as sulfuric acid, chlorosulfonic acid, nitric acid, oxalic acid, trifluoroacetic acid, ferric chloride, zinc chloride and boron trifluoride, generally tend to polymerize organocyclosiloxanes at a temperature lower than that of basic catalysts, but suffer inherent disadvantages due to their corrosive nature, their tendency to discolor the resulting polymers and/or their tendency to degrade functional groups attached to the cyclosiloxane ring causing premature crosslinking especially when linear high molecular weight polysiloxanes are desired. Further, not all acid catalysts have been found to be capable of polymerizing the more stable organocyclosiloxanes such as the cyclotetrasiloxanes.

The present invention provides a method for polymerization of organocyclosiloxanes which overcomes the problems associated with conventional basic and acidic catalysts to produce linear, organic-soluble polysiloxane polymers in high yield at room temperature (or slightly above) without the disadvantage of polymer discoloration or unwanted side reactions. It is well recognized that linear or straight chain polysiloxanes having the desired viscosity or molecular weight and devoid of crosslinked polysiloxane components are highly desireable. These will afford homogeneity and ease of formulation with catalysts, fillers or pigments. They are also useful as 100% solids compositions or solutions for casting of film, thus providing useful crosslinked film or rubber after curing.

Briefly, this invention provides bis(fluoroaliphaticsulfonyl)imides as a novel class of catalysts for the polymerization of organocyclosiloxanes. These catalysts, in their acid form, preferably have the general formula:

$$(R_fSO_2)_2NH \quad (I)$$

In formula I, $R_f$ is a monovalent fluorinated saturated aliphatic radical containing at least one carbon atom. Where said radical contains a plurality of carbon atoms in a skeletal chain, such chain may be branched or cyclic but preferably is a straight chain. Said skeletal chain of carbon atoms can be interrupted by hetero atoms or radicals, such as divalent oxygen or trivalent nitrogen atoms, each of which is bonded only to carbon atoms, but preferably where such hetero moieties are present, such skeletal chain does not contain more than one said hetero moiety for every two carbon atoms. An occasional carbon-bonded hydrogen atom, bromine atom, or chlorine atom may be present; where present, however, they preferably are present not more than once for every two carbon atoms. Thus, the non-skeletal valence bonds are preferably carbon-to-fluorine bonds, that is, $R_f$ is preferably perfluorinated. The total number of carbon atoms in $R_f$ can vary and be, for example, 1 to 18, preferably 1 to 8. Where $R_f$ is or contains a cyclic structure, such structure preferably has 5 or 6 ring members, 1 or 2 of which can be said hetero atoms, e.g., oxygen and/or nitrogen. The radical, $R_f$, is also one which is free of ethylenic or other carbon-to-carbon unsaturation, that is, it is a saturated aliphatic, cycloaliphatic, or heterocyclic radical. Examples of $R_f$ radicals are fluorinated alkyl, e.g., $CF_3-$, and alkyoxyalkyl, e.g., $CF_3OCF_2-$, said radicals being preferably perfluorinated, straight chain aliphatic radicals consisting only of carbon and fluorine atoms and having 1 to 8 carbon atoms therein. The two $R_f$ radicals in formula I can be the same or different.

The above-described bis(fluoroaliphaticsulfonyl)imides—occasionally referred to hereinafter as disulfonyl imides for purposes of brevity—can be prepared from fluoroaliphaticsulfonyl fluorides, $R_fSO_2F$, by procedures described in "Chemiker-Zeitung", 96 (10) 582 (1972) and German Offenlegungsschrift 2,239,817 (1974) (the latter disclosing that the disulfonyl imides are useful as catalysts in esterification).

Representative disulfonyl imides of formula I are $(CF_3SO_2)_2NH$, $CF_3SO_2NHSO_2C_4F_9$, $(C_4F_9SO_2)_2NH$, $CF_3SO_2NHSO_2C_8F_{17}$, $c\text{-}C_6F_{11}SO_2NHSO_2CF_3$, $c\text{-}C_6F_{11}CF_2SO_2NHSO_2CF_3$, $CF_3SO_2NHSO_2CF_2CF_2H$, $CF_3SO_2NHSO_2CF(CF_3)_2$, $C_4F_9SO_2NHSO_2C_8F_{17}$, $(C_8F_{17}SO_2)_2NH$, $CF_3SO_2NHSO_2(CF_2)_8Cl$, and

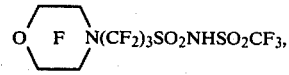

and mixtures thereof.

The disulfonyl imides are generally high boiling liquids or low melting solids, have high solubility in common polar solvents, e.g., tetrahydrofuran, glyme, p-dioxane, acetonitrile, and acetone, and in use do not evolve toxic products, and are relatively non-volatile. The catalysts, especially those having the preferred $R_f$ radicals, above, also tend to dissolve in organocyclosiloxanes at room temperatures producing clear, colorless solutions.

The bis(fluoroaliphaticsulfonyl)imide catalysts have the further advantage that they tend to be compatible with free radical catalysts, such as benzoyl peroxide, which are generally used to crosslink or cure polyorganocyclosiloxane gums to produce rubbers. Thus, in an admixture of disulfonyl imide, free radical catalyst and organocyclosiloxane, the disulfonyl imide can catalyze the ring-opening of the organocyclosiloxane to a linear gum at a temperature below the decomposition temperature of the free radical catalyst. With the addition of a basic filler to the admixture, the linear gum can be crosslinked to a rubber at an elevated temperature sufficient to decompose the free radical catalyst.

The organocyclosiloxanes described in the invention may be represented by the formula,

wherein n is a number from 3 to 8, R is a lower alkyl and R' is hydrogen, halogen, hydroxy, monovalent hydrocarbon radical, halogenated monovalent hydrocarbon radical, carboxy hydrocarbon radical and esters, alkenyl hydrocarbon radical or a cyanohydrocarbon radical having from 1 to 12 carbon atoms. R and R' may be the same or different and mixtures of the above represented cyclosiloxanes may be polymerized in accordance with the present invention. The preferred cyclosiloxanes, in view of economics and reactivity, are those in which R is methyl and n is 3 or 4. When n is 4, at least two R' radicals should be methyl. In general, the above cyclosiloxanes are those which do not contain known basic functionalities such as amino which tend to neutralize the disulfonyl imide catalysts and make them inoperative.

Further, the carbon chain of R or R' may be interrupted by non-basic elements or groups such as carbonyloxy group

or elements or groups which do not complex with the acid catalysts making them inoperative.

Examples of cyclosiloxanes which can be used to prepare useful fluids or gums by homopolymerization or copolymerization are those in which R' is:
1. a hydrocarbon radical (alkyl, aryl, alkaryl) such as,
    hexamethylcyclotrisiloxane
    octamethylcyclotetrasiloxane
    dodecamethylcyclohexasiloxane
    hexaethylcyclotrisiloxane
    1,2,3-trimethyl-1,2,3-triphenylcyclotrisiloxane
    1,2,3-trimethyl-1,2,3-tripropylcyclotrisiloxane
    1,2,3,4-tetramethyl-1,2,3,4-tetraethylcyclotetrasiloxane
    phenylheptamethylcyclotetrasiloxane
    benzylheptamethylcyclotetrasiloxane
    octylheptamethylcyclotetrasiloxane
2. an alkenyl hydrocarbon radical (vinyl, allyl, acrylyloxyalkyl

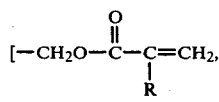

e.g., R=H or CH$_3$]) such as,
    1,2,3-trimethyl-1,2,3-trivinylcyclotrisiloxane
    1,2,3,4-tetramethyl-1,2,3,4-tetravinylcyclotetrasiloxane
    vinylheptamethylcyclotetrasiloxane
    allylheptamethylcyclotetrasiloxane
    acrylyloxymethylheptamethylcyclotetrasiloxane
3. a halogenated hydrocarbon radical such as,
    chloromethylheptamethylcyclotetrasiloxane
    bromomethylheptamethylcyclotetrasiloxane
    iodomethylheptamethylcyclotetrasiloxane
    3-chloropropylheptamethylcyclotetrasiloxane
    3,3,3-trifluoropropylheptamethylcyclotetrasiloxane
    1,2,3-tris(trifluoropropyl)-1,2,3-trimethylcyclotrisiloxane
    1,2,3-trimethyl-1,2,3-tris(chlorophenyl)cyclotrisiloxane
    1,2,3-trimethyl-1,2,3-tris(trifluoromethylphenyl)cyclotrisiloxane
4. a carboxy hydrocarbon radical or esters such as,
    carboxymethylheptamethylcyclotetrasiloxane
    acetyloxymethylheptamethylcyclotetrasiloxane
5. a cyano hydrocarbon radical such as,
    cyanomethylheptamethylcyclotetrasiloxane
    1,2,3-(gamma-cyanopropyl)-1,2,3-trimethylcyclotrisiloxane
    cyanophenylheptamethylcyclotetrasiloxane
6. a hydrogen, halogen or hydroxyl group such as,
    1,2,3-trihydro-1,2,3-trimethylcyclotrisiloxane
    1,2,3-trichloro-1,2,3-trimethylcyclotrisiloxane
    hydroheptamethylcyclotetrasiloxane
    chloroheptamethylcyclotetrasiloxane
    hydroxyheptamethylcyclotetrasiloxane The above polymerizations usually provide high molecular weight linear polysiloxane greases or gums having silanol

end groups which can be further polymerized by condensation or crosslinking to useful products such as rubbers or films.

Alternatively, organocyclosiloxanes or mixtures thereof can be polymerized in the presence of relatively low molecular weight (e.g., less than 5,000) linear siloxanes and silanes such as hexamethyldisiloxane, chloropentamethyldisiloxane and chlorotrimethylsilane providing stable fluids or fluids having reactive or non-reactive end groups. Such linear siloxanes and silanes when used as additives serve to terminate or end cap a growing siloxane polymer chain. For example, hexamethyldisiloxane is advantageously used to provide fluids, greases or gums having stable trimethylsilyl (—Si(CH$_3$)$_3$) end groups. When used in varying amounts with the catalysts of the invention, the linear siloxanes or silanes provide a method of reproducibly controlling the molecular weight of the resulting polymer to within defined ranges. Examples of such linear siloxanes and silane additives are:
    hexamethyldisiloxane
    1,3-diethyltetramethyldisiloxane
    phenylpentamethyldisiloxane
    1,3-chlorotetramethyldisiloxane
    hydropentamethyldisiloxane
    methoxypentamethyldisiloxane
    hydroxypentamethyldisiloxane
    1,3-divinyltetramethyldisiloxane
    bromomethylpentamethyldisiloxane
    2-carboxyethylpentamethyldisiloxane
    cyanomethylpentamethyldisiloxane
    acetyloxymethylpentamethyldisiloxane
    1,3-(acrylyloxymethyl)tetramethyldisiloxane
    tetradecamethylhexasiloxane
    docosamethyldecasiloxane
    chlorotrimethylsilane
    dichlorodimethylsilane
    divinyldichlorosilane hydroxytrimethylsilane.

Other siloxanes and silanes are given in the literature such as in "Chemistry and Technology of Silicones", Walter Noll, 1968 (tables 10, 14–16, 19, 22–25, 30, 35–37).

In the practice of the invention, the neutral or acidic organocyclosiloxane or mixtures of organocyclosiloxanes or mixtures of organisiloxanes with low molecular weight linear siloxanes or silanes are simply admixed with the catalyst, the admixture being permitted to polymerize (equilibrate) to a polysiloxane at the desired temperature. Temperatures of 25° C. to about 150° C. for times varying from minutes to several days can be used, with the preferred polymerization temperature range being 25° C. to 50° C. The catalyst usually dissolves in the organocyclosiloxane monomer giving a homogeneous, clear, colorless transparent reactive admixture which reacts to form the polymer. Essentially anhydrous conditions are preferred since lower molecular weight polymers can result when water is present and the cyclosiloxane can contain groups which degrade in presence of water.

The amount of catalyst can vary from about 0.05 to 10 wt. % or higher based on the weight of the organocyclosiloxane. The preferred amount is about 1%.

Although most polymerizations are preferred to be carried out without solvent, various solvents may be used to dissolve the solid cyclic siloxanes or to alter the molecular weight of the resulting polysiloxane. Suitable solvents are generally those which are non-basic and which are free of active protons which can interfere with growing polymerization centers. Suitable solvents include benzene, toluene, xylene, dimethoxyethane, methylene chloride, 1,1,2-trichloro-1,2,2-trifluoroethane and the like.

Generally, it is desirable to remove or neutralize the catalyst after the polymerization because its presence, like basic and other acidic catalysts, can adversely affect the properties of the resultant polymer. The catalyst may be simply removed by washing with water. Also, it may be neutralized by reaction with mildly basic reagents or, preferably, salts of organic or inorganic acids having acidities lower than the bis(fluoroaliphaticsulfonyl)imides (i.e. having a pKa greater than 1). Salts of carboxylic acids, e.g. sodium acetate, are advantageously used. Alternatively, in the case of gums which are to be milled with fillers to provide polysiloxane rubbers (i.e. where the polysiloxane is an intermediate in the production of silicon-based rubber), basic fillers such as zinc oxide can be compounded with the polymer to neutralize the catalyst.

The linear polysiloxanes provided by the invention can be mixed with catalysts and additives and cured to useful coatings and rubbers by known procedures. Some of the methods which can be used are described in "Chemistry and Technology of Silicones" By Walter Noll, 1968 (Chapter 8).

Objects and advantages of this invention are illustrated in the following examples which should not be construed to limit the scope of the invention. All parts are by weight unless otherwise specified.

EXAMPLE 1

To 10 g of bromomethylheptamethylcyclotetrasiloxane, which was being magnetic bar stirred at room temperature under nitrogen in a glass vial was added 0.2 g (2% by weight) of essentially anhydrous $C_4F_9SO_2NHSO_2CF_3$, ring opening catalyst, the mixture being stirred for about 15 min (until the catalyst had completely dissolved in the cyclotetrasiloxane). Stirring of the reaction mixture was continued for about 3 additional hours at which time the viscosity of the mixture (similar to heavy grease) was such that stirring by means of the magnetic bar was no longer possible. The polymerized material was allowed to stand for an additional 20 hours at room temperature at which time the reaction product had the consistency of a gum.

The gum was mixed with 0.2 g dry anhydrous sodium acetate to neutralize the catalyst and, the resulting mixture was stirred with 1,1,2-trichloro-1,2,2-trifluoroethane to dissolve the polymer. This mixture was washed with water, the water insoluble phase being separated and the dissolved polymer distilled to remove solvent. The residue was kept at 25° C. in vacuo for one hour giving 9.8 g of colorless linear polysiloxane gumstock containing dimethylsiloxane and bromomethylmethylsiloxane units in the polymer chain which was soluble in the above solvent, tetrahydrofuran (THF) or methylene chloride. The material had an inherent viscosity (0.5% by weight in THF) of 0.94.

EXAMPLE 2

Using the procedure of Example 1, 3.0 g stirred, octamethylcyclotetrasiloxane was polymerized with 0.3 g (1% by weight) $C_4F_9SO_2NHSO_2CF_3$, the reaction being run at 50° C. (the reaction mixture being heated with an oil bath for 30 minutes) the product being a highly viscous fluid. The polymer was kept at 50° C. for 6 hours and then permitted to come to 25° C. where it stood for 15 hours. The polymer was neutralized and isolated by procedures of Example 1 to give 2.5 g of colorless, soluble polydimethylsiloxane gum having an inherent viscosity (0.5% by weight in THF) of 1.2.

EXAMPLE 3

For purposes of comparison using the reaction vessel of Example 1, 15 g bromomethylheptamethylcyclotetrasiloxane and 0.3 g (2% by weight) concentrated sulfuric acid was stirred under nitrogen purge at room temperature for 22 hours. A large portion of the catalyst did not dissolve. The neutralized polymer was isolated by procedures described in Example 1 except that filtration of the water-insoluble phase was necessary to remove a large amount of insoluble gel. There was obtained 12.2 g of gel and 2.4 g of gum soluble in 1,1,3-trichloro-1,3,3-trifluoroethane. The gum had an inherent viscosity of 0.55 (0.5% by weight in THF). This run illustrates that sulfuric acid used as a catalyst can cause premature, undesired crosslinking to form an organic insoluble gel.

EXAMPLE 4

Also for comparison, with the material of Example 2, 9.4 g of octamethylcyclotetrasiloxane and 0.09 g (1% by weight) ferric chloride were stirred at room temperature in a nitrogen purged, glass reaction vessel. After 24 hours no measurable change in viscosity was noted and the fluid was highly colored (black). After six days, the fluid had a viscosity of a heavy weight oil; a gum resulted after 20 days. Similar results occured using 0.1% by weight of ferric chloride except the fluid was yellow. Hence the ferric chloride was much less effective as a catalyst for ring-opening polymerization and the polymer is highly colored.

EXAMPLE 5

Using the procedures of Example 1, 4 g of iodomethylheptamethylcyclotetrasiloxane was polymerized with 0.06 g of $C_4F_9SO_2NHSO_2CF_3$ at room temperature over a period of 45 hours stirring being continued. After neutralization and water washing, there was obtained 4 g of a polysiloxane gum which was soluble in 1,1,2-trichloro-1,2,2-trifluoroethane, the gum having an inherent viscosity of 0.9 (0.5 weight % in THF) and contained dimethylsiloxane and iodomethylmethylsiloxane units in the polymer chain.

EXAMPLE 6

Using procedures described in Example 1, 4.9 g of acryloyloxymethylheptamethylcyclotetrasiloxane was polymerized at 25° C. (over the course of two days) using 0.1 g $C_4F_9SO_2NHSO_2CF_3$. After neutralization and water washing, 4.2 g of clear polysiloxane gum was obtained, this gum being soluble in methylene chloride and the gum had an inherent viscosity of 0.53 (0.5% by weight in THF). Under similar conditions, methacryloyloxymethylheptamethylcyclotetrasiloxane was polymerized giving a clear soluble gum having an inherent viscosity of 0.44.

EXAMPLE 7

A copolymer was obtained by polymerization (under a $N_2$ purge) of a solution of 17 g of octamethylcyclotetrasiloxane and 3 g of acryloyloxymethylheptamethylcyclotetrasiloxane at 25° C. using 0.26 g of $C_4F_9SO_2NHSO_2CF_3$ as catalyst. After sodium acetate neutralization and water washing, there was obtained 17.8 g of a clear gum which was soluble in toluene, tetrahydrofuran and methylene chloride. The gum had an inherent viscosity of 1.01.

EXAMPLE 8

Linear siloxane end-capping groups can be used to limit the final molecular weight of the polymer.

This example exemplifies polymerization in the presence of a molecular weight controlling linear siloxane giving a fluid having stable trimethylsilyl end groups and acrylate function pendant groups.

Using procedures given in Example 1, a solution of 170 g of octamethylcyclotetrasiloxane, 30 g of acryloyloxymethylheptamethylcyclotetrasiloxane and 0.85 g of hexamethyldisiloxane was stirred at 25° C. for 45 hours in the presence of 1% by wt. of $C_4F_9SO_2NHSO_2CF_3$. The clear fluid, after neutralization and water washing, was heated to 125° C. in vacuo and evaporated for one hour to remove volatile components. There was obtained 181 g of clear fluid having a viscosity of 2250 centistokes at 25° C. The fluid contained 2.4 mol % acrylate pendant groups determined by nuclear magnetic resonance spectroscopy. Using the above procedure, a solution of 85 g of octamethylcyclotetrasiloxane, 45 g of acrylyloxymethylheptamethylcyclotetrasiloxane and 0.2 % by weight (based on the first monomer) of hexamethyldisiloxane was polymerized using $C_4F_9SO_2NHSO_2CF_3$ catalyst to produce a fluid having a viscosity of 13,000 centistokes (25° C.).

EXAMPLE 9

(polymerization of cyclotetrasiloxane with SiH group)

Using the procedure of Example 1, 4.0 g of monohydroheptamethylcyclotetrasiloxane was polymerized with 0.07 g of $C_4F_9SO_2NHSO_2CF_3$ at room temperature (72 hr.). After neutralization and water washing, there was obtained 3.2 g of a linear polysiloxane gum having an inherent viscosity (0.5 weight % in THF) of 1.06. The gum contained dimethylsiloxane and methylhydrosiloxane units in the polymer chain.

EXAMPLE 10

(shows cyclotrisiloxane polymerized in solvent)

A mixture of 4.0 g of hexamethylcyclotrisiloxane, 6 g of 1,1,2-trichloro-1,2,2-trifluoroethane (solvent) and 0.04 g of $C_4F_9SO_2NHSO_2CF_3$ was stirred under nitrogen at 25° C. for 48 hours. After neutralization of the catalyst, water washing and solvent removal, there was obtained 3.2 g of a linear polydimethylsiloxane polymer. The polymer, which was soluble in toluene and tetrahydrofuran, was a heavy grease having an inherent viscosity of 0.75 (0.5 weight % in THF).

EXAMPLE 11

(use of $C_8F_{17}SO_2NHSO_2CF_3$ as catalyst)

Using the procedure of Example 1, 10 g of octamethylcyclotetrasiloxane was polymerized with 0.13 g of $C_8F_{17}SO_2NHSO_2CF_3$. The final neutralized product (9.7 g) was a linear polydimethylsiloxane, which was a heavy grease soluble in tetrahydrofuran and had an inherent viscosity (0.5 weight % in THF) of 0.75.

EXAMPLE 12

(shows effect of water on the polymerization)

A mixture of 55 g of octamethylcyclotetrasiloxane, 0.7 g of $C_4F_9SO_2NHSO_2CF_3$ and 0.5 g of water was stirred at room temperature for 4 days. The product, after neutralization of the catalyst and water washing as described in Example 1, was a viscous fluid. The fluid was heated at 100° C. under vacuum to remove volatile components. The residue (35 g) was a linear polydimethylsiloxane gum having an inherent viscosity (0.5 weight % in THF) of 1.02. The yield of the gum was lower than obtained by polymerization in the absence of water.

EXAMPLE 13

(crosslinking of gum)

Using the procedure described in Example 7, a gum (inherent viscosity of 0.8) was obtained by copolymerization of 10.7 g of octamethylcyclotetrasiloxane and 0.1 g of acryloyloxymethylheptamethylcyclotetrasiloxane. 0.7 g of the gum and 0.05 g of Luperco ® 101 XL, a difunctional peroxide compounded with a filler, the active component of which is 2,5-dimethyl-2,5-bis(t-butylperoxy)hexane, was thoroughly mixed in an aluminum dish and heated in an oven at 160° C. for 40 min. A white rubber, insoluble in benzene was obtained.

What is claimed is:

1. The process comprising the steps of mixing an organocyclosiloxane with from about 0.05 to 10 weight percent, based on the weight of the organocyclosiloxane, of a bis(fluoroaliphaticsulfonyl)imide as a catalyst for polymerization thereof and polymerizing said organocyclosiloxane.

2. A process according to claim 1 wherein said catalyst has the formula

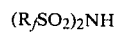

where $R_f$ is a fluorinated saturated aliphatic radical.

3. A process according to claim 1 wherein said catalyst is mixed with said organocyclosiloxane in the form of a solution.

4. A process according to claim 1 wherein said catalyst is mixed with said organocyclosiloxane and polymerization is effected by temperatures of 25° C. to 50° C.

5. A process according to claim 1 wherein said organocyclosiloxane has the formula

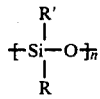

wherein n has a value from 3 to 8, R is lower alkyl and R' is selected from the group consisting of hydrogen, halogen, hydroxy, monovalent hydrocarbon radical, halogenated monovalent hydrocarbon radical, carboxy hydrocarbon radical and esters, alkenyl hydrocarbon radical or cyanohydrocarbon radical having 1 to 12 carbon atoms, R and R' being the same or different.

6. A method according to claim 5 wherein said organocyclosiloxane has a formula

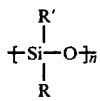

wherein n is 3 or 4 and R is methyl.

7. A method according to claims 5 or 6 wherein n has the value 3 or 4, one of the R' groups is hydrogen, halogen, hydroxy, monovalent hydrocarbon radical, halogenated monovalent hydrocarbon radical, carboxy hydrocarbon radical and esters, alkenyl hydrocarbon radical or cyanohydrocarbon radical having 1 to 12 carbon atoms and the remainder R' groups are methyl.

8. A method of controlling the molecular weight of polysiloxane comprising mixing organocyclosiloxane, bis(perfluoroaliphaticsulfonyl)imide as a catalyst for polymerizing said organosiloxane and a chain terminating siloxane or silane and copolymerizing said organocyclosiloxane and said chain terminating agent.

9. A method according to claim 5 wherein said organocyclosiloxane is selected from octamethylcyclotetrasiloxane, hexamethylcyclotrisiloxane, Bromomethylheptamethylcyclotetrasiloxane, Chloromethylheptamethylcyclotetrasiloxane, hydroheptamethylcyclotetrasiloxane, acryloyloxymethylheptamethylcyclotetrasiloxane, or methacryloyloxymethylheptamethylcyclotetrasiloxane.

10. The process according to claim 1 wherein about 1% by weight of a bis(fluoroaliphaticsulfonyl)imide catalyst is mixed with an organocyclosiloxane.

11. A process according to claim 2 wherein $R_f$ is a straight-chain, branched-chain or cyclic fluorinated saturated aliphatic radical of 1 to 18 carbon atoms that may be interrupted by heteroatoms selected from divalent oxygen atoms and trivalent nitrogen atoms wherein said aliphatic radical does not contain more than one such heteroatom for every two carbon atoms and where there is no more than one atom selected from hydrogen, bromine and chlorine present for every two carbon atoms.

12. A process according to claim 11 wherein $R_f$ is perfluorinated.

13. A process according to claim 11 wherein $R_f$ comprises 1 to 8 carbon atoms.

14. A process according to claim 5 wherein said catalyst has the formula $$(R_fSO_2)_2NH$$

wherein $R_f$ is a straight-chain, branched-chain or cyclic fluorinated saturated aliphatic radical of 1 to 18 carbon atoms that may be interrupted by heteroatoms selected from divalent oxygen atoms and trivalent nitrogen atoms wherein said aliphatic radical does not contain more than one such heteroatom for every two carbon atoms and where there is no more than one atom selected from hydrogen, bromine and chlorine present for every two carbon atoms.

15. A process according to claim 5 wherein $R_f$ is perfluorinated.

16. A process according to claim 5 wherein $R_f$ comprises 1 to 8 carbon atoms.

* * * * *